(12) United States Patent
Young et al.

(10) Patent No.: US 8,461,286 B2
(45) Date of Patent: Jun. 11, 2013

(54) PROCESS FOR MANUFACTURING LIQUID EPOXY RESINS

(75) Inventors: Thomas C. Young, Lake Jackson, TX (US); Clinton J. Boriack, Brenham, TX (US); Elwin G. Collier, Houston, TX (US); Robert M. Drake, Richwood, TX (US); Joachim Drewing, Hollern-Twielenfleth (DE); Edward J. Kronenberger, Missouri City, TX (US); Shuji Maeda, Lake Jackson, TX (US); Paulo Alfonso Dos Santos Pereira, Lake Jackson, TX (US); Andreas Tigges, Stade (DE); Roland Werner, Hamburg (DE); Mark S. Burkinshaw, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 285 days.

(21) Appl. No.: 12/933,840

(22) PCT Filed: Mar. 24, 2009

(86) PCT No.: PCT/US2009/038089
§ 371 (c)(1),
(2), (4) Date: Sep. 21, 2010

(87) PCT Pub. No.: WO2009/120685
PCT Pub. Date: Oct. 1, 2009

(65) Prior Publication Data
US 2011/0028744 A1    Feb. 3, 2011

Related U.S. Application Data

(60) Provisional application No. 61/039,269, filed on Mar. 25, 2008.

(51) Int. Cl.
*C08G 59/06*    (2006.01)
*C08L 61/12*    (2006.01)
*C07D 301/27*    (2006.01)

(52) U.S. Cl.
USPC ............................ 528/87; 525/507; 549/517

(58) Field of Classification Search
USPC .............................. 549/517; 528/87; 525/507
See application file for complete search history.

(56) References Cited

U.S. PATENT DOCUMENTS

| | | | |
|---|---|---|---|
| 3,221,032 A | 11/1965 | McWhorter | |
| 4,373,073 A | 2/1983 | Wojtech et al. | |
| 4,390,680 A | 6/1983 | Nelson | |
| 4,582,892 A | 4/1986 | Chang et al. | |
| 4,624,975 A | 11/1986 | Pham | |
| 4,900,801 A * | 2/1990 | Takata et al. | 528/87 |
| 5,245,057 A | 9/1993 | Shirtum | |

FOREIGN PATENT DOCUMENTS

| CH | 575405 A5 | 5/1976 |
|---|---|---|
| FR | 2217372 A1 | 9/1974 |

(Continued)

*Primary Examiner* — Taylor Victor Oh

(57) ABSTRACT

A process for the production of liquid epoxy resins, including: contacting a polyhydric phenol and an epihalohydrin in the presence of an ionic catalyst to form a halohydrin intermediate reaction product; concurrently: reacting a portion of the halohydrin intermediate reaction product with an alkali hydroxide to form a solid salt suspended in a liquid mixture including a dehydrohalogenated product and unreacted halohydrin intermediate, wherein the alkali hydroxide is used at less than a stoichiometric amount; and removing water and epihalohydrin as a vapor from the reacting mixture; separating the solid salt from the liquid mixture; reacting at least a portion of the unreacted halohydrin intermediate with an alkali hydroxide in the presence of water to form an organic mixture including an epoxy resin and unreacted epihalohydrin and an aqueous solution including a salt; separating the aqueous mixture from the organic mixture; and separating the unreacted epihalohydrin from the liquid epoxy resin.

9 Claims, 1 Drawing Sheet

FOREIGN PATENT DOCUMENTS

| | | |
|---|---|---|
| GB | 788887 A | 1/1958 |
| GB | 1278737 A | 6/1972 |
| JP | 58-24578 | 2/1983 |
| JP | 11158248 A | 6/1999 |

* cited by examiner

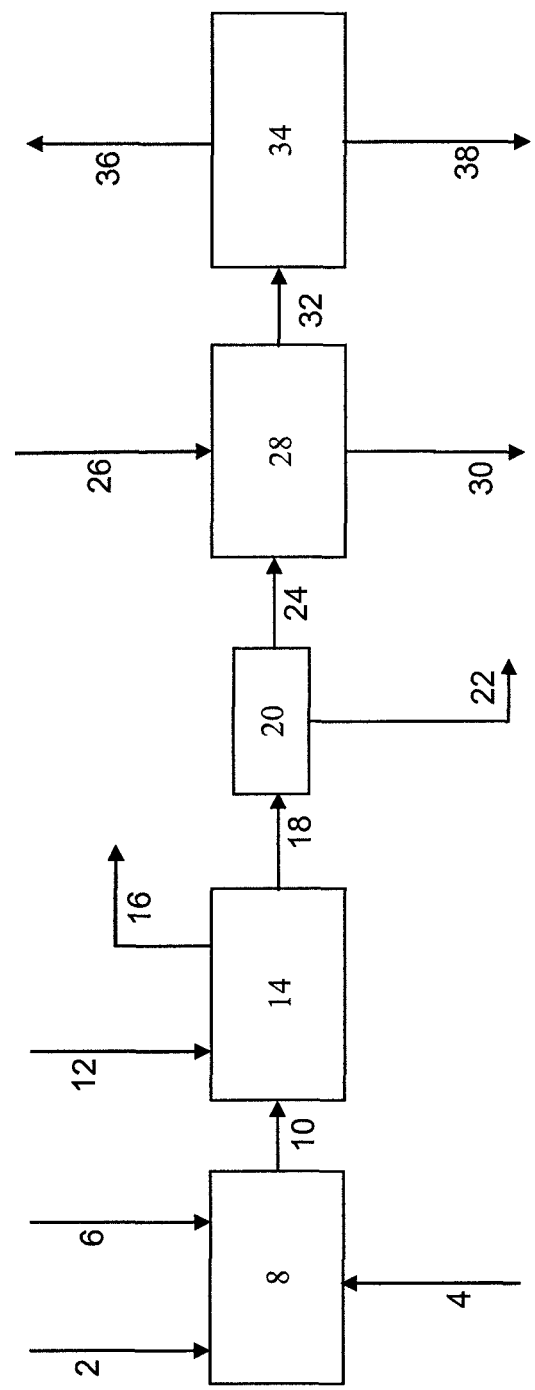

PROCESS FOR MANUFACTURING LIQUID EPOXY RESINS

BACKGROUND OF DISCLOSURE

1. Field of the Disclosure

Embodiments disclosed herein relate generally to a process to manufacture liquid epoxy resins by reaction of a polyhydric phenol with an epihalohydrin using an anionic catalyst. The resulting reaction product may then be dehydrohalogenated using an alkali metal hydroxide or alkali earth hydroxide in two reaction steps. The dehydrohalogenation reactions are performed to achieve a high raw material yield while avoiding problems associated with insoluble polymer formation.

2. Background

In the manufacture of epoxy resins, a high raw material yield can be achieved by removing water during dehydrohalogenation with alkali hydroxides to maintain a low water content. However, reactions done under these conditions are susceptible to the formation of insoluble polymers, which can cause problems in the subsequent processing steps.

In contrast, dehydrohalogenation reactions done without water removal can be less susceptible to polymer formation, but also results in a lower raw material yield. Another difficulty with dehydrohalogenation reactions done with water removal is the difficulty in obtaining a product with low variability, because of the sensitivity of product hydrolysable chlorides to the amount of caustic added.

As a result of the above, post-treatment reactions are frequently used to achieve the desired levels of hydrolysable chlorides, and reprocessing of material must often be done.

GB 1278737 discloses a process in which bisphenol-A and epichlorohydrin are reacted with a catalyst, and then dehydrochlorinated using 80-99 percent of the stoichiometric caustic requirement in an azeotropically distilled reactor. Then, the unreacted epichlorohydrin is removed by evaporation and the stripped epoxy resin is combined with a solvent, and then subjected to a second dehydrochlorination reaction.

U.S. Pat. No. 3,221,032 discloses a process in which bisphenol-A and epichlorohydrin are reacted with a catalyst at 125° C. or above, then subjecting the mixture to a dehydrohalogenation reaction using an alkali hydroxide, alkaline earth hydroxide or other base.

U.S. Pat. No. 4,582,892 discloses a process in which bisphenol-A and epichlorohydrin are reacted with a catalyst to form a halohydrin intermediate, then removing the epichlorohydrin and adding a solvent, then subjecting the resulting mixture to a dehydrohalogenation reaction.

CH 575405 discloses a process in which bisphenol-A and epichlorohydrin are reacted with a catalyst to form a halohydrin intermediate, then dehydrohalogenating with an alkali with the excess epichlorohydrin either present or removed. The dehydrohalogenation step is to be done in such a way that no solid salt forms.

U.S. Pat. No. 4,373,073 discloses a process in which bisphenol-A and epichlorohydrin are reacted to form a chlorohydrin ether intermediate, and then a quaternary ammonium catalyst or a similar catalyst is added to accelerate phase transfer reactions during the dehydrohalogenation step.

JP 11158248 discloses a process in which a monofunctional or polyhydric phenol and epichlorohydrin are reacted with 0.2 to 0.9 equivalents alkali metal hydroxide with azeotropic distillation to remove water, and then with additional alkali metal hydroxide after "the pressure is returned to normal" and an organic solvent is added.

JP 58-24578 discloses a process in which a phenol and an epihalohydrin are reacted using a quaternary amine catalyst, then dehydrohalogenated with an alkali hydroxide while removing water.

GB 778887 discloses a process in which a polyhydric phenol and an epihalohydrin are etherified and partially dehydrohalogenated in an alkaline medium using 90-98 percent of an equivalent of alkali metal hydroxide per phenolic hydroxyl equivalent. The excess epihalohydrin is then removed and a second dehydrohalogenation step is performed, optionally in solvent.

Accordingly, there exists a need for processes for the manufacture of liquid epoxy resins (LER) with a high raw material yield and without polymer formation. Such processes should have a high reliability and a low cost. Additionally the processes should have a low variability, avoiding the need to rework product.

SUMMARY OF THE DISCLOSURE

In one aspect, embodiments disclosed herein relate to a process for the production of liquid epoxy resins, including: contacting a polyhydric phenol and an epihalohydrin in the presence of an ionic catalyst to form a halohydrin intermediate reaction product; concurrently: reacting a portion of the halohydrin intermediate reaction product with an alkali hydroxide to form a solid salt suspended in a liquid mixture including a dehydrohalogenated product and unreacted halohydrin intermediate, wherein the alkali hydroxide is used at less than a stoichiometric amount; and removing water and epihalohydrin as a vapor from the reacting mixture; separating the solid salt from the liquid mixture; reacting at least a portion of the unreacted halohydrin intermediate with an alkali hydroxide in the presence of water to form an organic mixture including an epoxy resin and unreacted epihalohydrin and an aqueous solution including a salt; separating the aqueous mixture from the organic mixture; and separating the unreacted epihalohydrin from the liquid epoxy resin.

In another aspect, embodiments disclosed herein relate to a system for the production of a liquid epoxy resin, the system including: at least one reactor for contacting a polyhydric phenol and an epihalohydrin in the presence of an ionic catalyst to form a halohydrin intermediate reaction product; at least one reactor for concurrently: reacting a portion of the halohydrin intermediate reaction product with an alkali hydroxide to form a solid salt suspended in a liquid mixture including a dehydrohalogenated product and unreacted halohydrin intermediate, wherein the alkali hydroxide is used at less than a stoichiometric amount; and removing water and epihalohydrin as a vapor from the reacting mixture; a separator for separating the solid salt from the liquid mixture; at least one reactor for reacting at least a portion of the unreacted halohydrin intermediate with an alkali hydroxide in the presence of water to form an organic mixture including an epoxy resin and unreacted epihalohydrin and an aqueous solution including a salt; a separator for separating the aqueous mixture from the organic mixture; and a separator for separating the unreacted epihalohydrin from the liquid epoxy resin.

Other aspects and advantages will be apparent from the following description and the appended claims.

BRIEF DESCRIPTION OF DRAWINGS

FIG. 1 is a simplified process flow diagram illustrating a process for manufacturing liquid epoxy resins according to embodiments disclosed herein.

DETAILED DESCRIPTION

In one aspect, embodiments disclosed herein relate to a process to manufacture liquid epoxy resins by reaction of a polyhydric phenol with an epihalohydrin using an anionic catalyst. The resulting reaction product may then be dehydrohalogenated using an alkali metal hydroxide or alkali earth hydroxide in two reaction steps. The dehydrohalogenation reactions are performed to achieve a high raw material yield while avoiding problems associated with insoluble polymer formation.

Processes disclosed herein include the reaction of a polyhydric phenol, such as bisphenol-A, with an epihalohydrin, such as epichlorohydrin, using a quaternary ammonium catalyst. The resulting reaction product is then partially dehydrohalogenated using 80-95 percent of the stoichiometric caustic requirement in an agitated reactor where the water content is controlled by evaporation. The solid salt formed in this reactor is then removed by centrifuge and is treated to recover resin. The centrate from the centrifuge is then contacted with a caustic/water mixture in a second reactor to complete the dehydrohalogenation, and the water level is maintained to prevent polymer formation. The reactor effluent is then contacted with water to remove ionic impurities. Volatile components, including the excess epichlorohydrin, are then stripped to give a liquid epoxy resin product, which has low hydrolysable chloride content.

Suitable polyhydric phenols that may be used in embodiments disclosed herein include, for example, those mononuclear and polynuclear polyhydric phenols represented by the formulas $(R)_2\text{-Ph-}(A)_n\text{-Ph-}(R)_2$, $R\text{-Ph-}[A\text{-Ph}]_m\text{-R}$, $R\text{-Ph-}A'\text{-}(Ph\text{-R})_2$, and

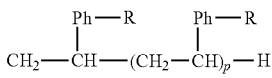

wherein Ph represents a phenol group; each A is independently a divalent hydrocarbon group having from 1 to about 12 carbon atoms, —O—, —S—, —S—S—,

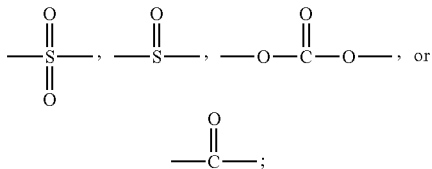

A' is a trivalent hydrocarbon group having from 1 to about 12 carbon atoms; each R is independently hydrogen, a hydrocarbyl group having from 1 to about 10 carbon atoms, a halogen atom, such as chlorine or bromine, or a hydroxyl group; p has a value of from about 1 to about 100; m has a value from about 1 to about 6; and n has a value of zero or 1.

Other polyhydric phenols are described in U.S. Pat. Nos. 4,582,892 and 4,373,073, which are incorporated herein by reference. Suitable polycyclopentadiene polyphenols and methods for their preparation can be found in U.S. Pat. No. 4,390,680, which is incorporated herein by reference.

Suitable epihalohydrins that may be used in embodiments disclosed herein include those represented by the formula

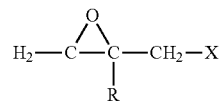

where R is hydrogen or a hydrocarbyl group having from 1 to about 4 carbon atoms and X is a halogen, such as chlorine or bromine.

Suitable dehydrohalogenating agents that may be used in embodiments disclosed herein include alkali metal hydroxides such as, for example, sodium hydroxide, potassium hydroxide, lithium hydroxide or mixtures thereof. The alkali metal hydroxide can be added either continuously or incrementally. In other embodiments, the dehydrohalogenating agent may include alkali earth hydroxides.

Anionic catalysts useful in embodiments disclosed herein include quaternary ammonium halide catalysts such as benzyl trimethyl ammonium chloride, benzyl triethyl ammonium chloride, tetraethyl ammonium chloride, tetramethyl ammonium chloride, tetraethanol ammonium chloride, tetraethanol ammonium hydroxide and the like. Other useful catalysts include quaternary phosphonium compounds, sulfonium compounds and the like. Suitable quaternary phosphonium compounds include ethyl triphenyl phosphonium iodide, ethyl triphenyl phosphonium bicarbonate, benzyl triphenyl phosphonium chloride, tetrabutyl phosphonium chloride and the like. Suitable sulfonium catalysts include thiourea catalysts such as tetramethyl thiourea, N,N'-diphenyl thiourea and the like. Basic ion exchange resins, such as DOWEX MSA-1, available from The Dow Chemical Company, Midland, Mich., are also useful catalysts. Other ionic catalysts that may be used in embodiments disclosed herein are disclosed in U.S. Pat. Nos. 4,624,975 and 5,245,057, each of which are incorporated herein by reference.

The amount of catalyst employed in the coupling reaction is any quantity that will suitably catalyze the reaction between the polyhydric phenol and the epihalohydrin. In some embodiments, quantities from about 0.001 to about 0.15 moles of catalyst per mole of polyhydric phenol is used; in other embodiments, from about 0.01 to about 0.02 moles of catalyst per mole of polyhydric phenol is used.

Embodiments of the processes disclose herein may be performed without any added organic solvent. When used, suitable solvents may include ketones, aromatic hydrocarbons, halogenated aliphatic compounds such as, for example, methyl isobutyl ketone, methyl ethyl ketone, toluene, xylene, methylene chloride, ethylene dichloride, mixtures thereof and the like.

Referring now to FIG. 1, a simplified process flow diagram illustrating a process for manufacturing liquid epoxy resins according to embodiments disclosed herein is illustrated. A polyhydric phenol 2, such as Bisphenol A, and an epihalohydrin 4, such as epichlorohydrin, are contacted with an anionic catalyst 6 in one or more reactors 8. An excess of epichlorohydrin is used to produce a coupled bisphenol-A/epichlorohydrin reaction product.

The reactors 8 may be batch or continuous reactors. If continuous, a series of reactors may be used. The reactors 8 may be operated at temperatures from 20° C. to 100° C. in some embodiments; from 40° C. to 70° C. in other embodiments. The reactors may be cooled to remove the heat of reaction.

Epichlorohydrin to bisphenol molar ratios in the initial mixture may be from 2:1 to 20:1 in some embodiments; 5:1 to 10:1 in other embodiments; and may be varied depending on the composition of the epoxy resin to be produced.

The coupled polyhydric phenol and epihalohydrin mixture 10 is partially dehydrohalogenated by reaction with an alkali hydroxide 12 in one or more agitated reactors 14. Water may be removed by evaporation of an epihalohydrin-water mixture 16, such as by maintaining the reaction mixture under vacuum to keep the reaction temperatures low. Water removal results in decreased byproduct formation, resulting in high yield. Partial dehalohydrogenation, using ≦95 percent of the stoichiometric caustic, prevents polymer formation (stoichiometric caustic being defined as 1 mole of NaOH per mole-equivalent of phenolic hydroxide groups in the original mixture of polyhydric phenol and epihalohydrin). Solid salt forms in reactors 14, and may be suspended in the organic medium in the reactors by agitation.

The reactors 14 may be batch or continuous reactors. If continuous, a series of reactors may be used. In some embodiments, one continuous reactor is used. The reactors are heated to evaporate water, either by external heat exchangers or by incorporating passages for a heating fluid in the reactor. Because of the physical properties of the water and epihalohydrin, evaporation of water results in a mixed epihalohydrin/water vapor, which must be removed from the reactor. The reactors 14 may be operated at temperatures from 30° C. to 90° C. in some embodiments; from 40° C. to 75° C. in other embodiments. The reactors are operated below atmospheric pressure to allow water removal at these low operating temperatures. Operating pressures may range from 0.05-0.9 bar in some embodiments.

The alkali hydroxide 12 used in reactors 14 may include, for example, sodium hydroxide, which may be in solid or liquid form. In some embodiments, a sodium hydroxide/water solution containing 25 percent or more NaOH is used.

Less than the stoichiometric amount of alkali hydroxide needed to fully dehydrohalogenate the epoxy resin is added to this reactor. For example, in some embodiments, 0.5-0.95 of the stoichiometric amount is used; in other embodiments, 0.8-0.95 of the stoichiometric amount is used. The reactor 14 may be agitated to ensure good mixing of the reactants, achieve good heat transfer and to suspend the salt. Mechanical agitation or jet mixing may be used, for example.

The effluent 18 from reactor 14 may then be processed to separate the solid salt formed from the organic liquid. Effluent 18 may pass through a salt removal system 20, resulting in salt stream 22 and a coupled polyhydric phenol/epihalohydrin mixture 24. In some embodiments, the solid salt may be removed by filtration, centrifugation or other solid/liquid separation techniques. Alternatively, the salt may be separated from the organic liquid by dissolving the salt in water, then separating the aqueous and organic phases.

The solid salt cake separated by centrifuge or filtration may contain residual liquid. In some embodiments, the residual liquid content of the cake is less than 60 percent, by weight; in other embodiments, the liquid content is less than 40 percent, by weight.

The coupled polyhydric phenol/epihalohydrin mixture 24 (halohydrin intermediate) is then contacted with an alkali hydroxide/water mixture 26 in one or more reactors 28 to complete the dehydrohalogenation of the epoxy resin. Water is present in this reaction step to prevent the formation of polymer. A stoichiometric excess of alkali hydroxide may be used to obtain low levels of halohydrin content.

The reactors 28 may be batch or continuous. If continuous, a series of reactors may be used. Reactors 28 may be agitated to improve contacting of the two liquid phases, but not so highly agitated that the aqueous phase is finely dispersed and difficult to separate from the organic phase. These reactors may be operated in association with settling stages where the aqueous and organic phases will be separated. If a series of reactors are used, they may be connected in a countercurrent, co-current or crossflow arrangement. Alternatively, a continuous reactor with multiple stages may be used.

Alkali hydroxide/water mixture 26 includes aqueous alkali hydroxide solutions, and can include various concentrations of the alkali halide in water. In reactor 28, in contrast to the operation of reactor 14, water is not removed by evaporation. As such, the concentration of the alkali hydroxide in water should not be so high that the saturation point of the alkali hydroxide or the byproduct salt in the water is exceeded, so that no solids precipitate in the reactor. Other components may be added to the alkali hydroxide solutions, such as components that would increase the density difference between the phases or otherwise improve the operation of the reactor.

Reactors 28 should be operated at temperatures sufficient to avoid or minimize raw material loss due to hydrolysis. In some embodiments, reactors 28 may be operated at temperatures less than 50° C.; in other embodiments, reactor 28 operating temperatures are less than 30° C.

Following the reaction of the alkali hydroxide in reactors 28, the aqueous and organic phases may be separated, resulting in a waste brine solution 30, and an organic phase 32 including the epoxy resin (the coupled and dehydrohalogenated polyhydric phenol/epihalohydrin reaction product) and any residual epihalohydrin. Separation of the organic phase and the aqueous phase may be accomplished via any liquid-liquid separation, including decanters, coalescers, and decanting centrifuges.

The epoxy resin may then be separated from the epihalohydrin by any suitable means. For example, the excess epihalohydrin and other volatile components can be removed from the liquid epoxy resin in separator 34, such as by evaporation or distillation. This is typically performed at high temperatures and under vacuum. The epihalohydrin and other volatile components may be recovered via stream 36, and the liquid epoxy resin via stream 38.

A variety of process equipment 34 may be used to recover the epoxy resin from the epichlorohydrin/epoxy resin mixture. For example, one method is to evaporate epihalohydrin and other volatile components from the liquid epoxy resin using a flash evaporator, falling film evaporator, boiling tube evaporators, wiped film evaporator, stripping columns, and other thin-film evaporators. This evaporation step may be performed at temperatures of 150° C. or higher and under vacuum. Pressures of 100 millibar or less are typically used. Combinations of evaporation operations may also be used.

In some embodiments, the reaction product 32 may be washed by contact with water to remove ionic species and other water soluble impurities prior to epichlorohydrin removal.

In other embodiments, the solid salt 22 may be treated to remove residual epichlorohydrin, epoxy resin and other components, and to prepare the solid salt for disposal. For example, a filter cake including the solid salt and residual liquid may be pressed or washed to separate the organic liquids from the solid salt.

Various methods may also be used to recover and/or recycle raw material, such as epichlorohydrin, from waste streams from the process, such as streams 16, 22, 30, and 36. For example, the epichlorohydrin/water vapor 16 from reactor 14 may be condensed, and then may be treated to recover the water and epichlorohydrin for additional use.

EXAMPLES

A mixture of 21.5 percent bisphenol-A and 0.214 percent benzyl trimethyl ammonium chloride by weight in epichlorohydrin is prepared and reacted in agitated reactors at atmospheric pressure and temperatures ranging from 50° C. to 62° C. The resulting reaction product is analyzed by HPLC and greater than 95 percent of the phenolic hydroxyl groups are found to have reacted. The mixture is then reacted with a 50 percent sodium hydroxide/water mixture at a temperature of about 65° C. and a pressure of about 200 mm Hg. Steam is supplied to the jacket of the reactor, and a vapor containing water and epichlorohydrin is removed from the reactor and condensed. Sodium hydroxide is added in an amount of 0.89 gmol-equivalents per gmol-equivalent of phenolic hydroxyl groups contained in the bisphenol-A of the original mixture. Solid sodium chloride is formed as a result of the reaction. The reaction mixture is analyzed and found to contain 0.13 percent by weight 1,3-dichloro-2-propanol and the epoxy resin contained in the mixture is found to have 1.45 percent hydrolysable chloride content by weight based on the resin content of the mixture. The mixture is also found to contain no insoluble polymer.

The mixture is treated in a centrifuge to remove the solid salt. The resulting centrate is treated with an aqueous mixture of sodium hydroxide and sodium carbonate. The aqueous mixture is added to the reactor in an amount of 0.58 gmol-equivalent sodium hydroxide per gmol-equivalents of phenolic hydroxyl groups contained in the bisphenol-A of the original mixture. The reactor is maintained at a temperature from 17° C. to 20° C. The organic and aqueous phases are separated and the organic phase is analyzed and found to have 50 to 100 ppm by weight hydrolysable chloride content based on the resin content of the mixture. The organic phase is then contacted with water to remove ionic and water soluble species, using a ratio of 1 part water to 10 parts organic, by weight. The water and organic phases are separated, and the epoxy resin is recovered from the organic phase by vacuum distillation. The resulting epoxy resin is analyzed and found to have the properties shown in Table 1.

TABLE 1

| Viscosity at 25° C., cP | 9400-9900 |
| Hydrolysable chloride (ppm) | 50-100 |
| Total Chloride (ppm) | 1500-1900 |

As described above, embodiments disclosed herein may provide for systems and processes for producing liquid epoxy resins that do not require the use of solvents, which eliminates solvent separation and purification equipment. Processes which use solvents require separate evaporation of the epihalohydrin and solvent from the epoxy resin, which requires additional equipment, and the associated capital costs, and consumes a substantial amount of additional energy.

Advantageously, embodiments disclosed herein may provide for use of an azeotropically-distilled reaction for 80-95 percent of the dehydrohalogenation to achieve a high raw material yield, preventing the formation of polymer that can occur when more than 95 percent of the stoichiometric alkali hydroxide is added under azeotropically-distilled conditions. Additionally, removing the solid salt and completing the dehydrohalogenation with an aqueous brine phase present prevents polymer formation while allowing production with very low levels of hydrolysable halides. The combination of these two reaction steps allows production of an epoxy resin with low hydrolysable halide content with high raw material yield and without polymer formation which cannot be achieved with one reactor technology alone.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for the production of liquid epoxy resins, the process consisting essentially of:
    contacting a polyhydric phenol and an epihalohydrin in the presence of an ionic catalyst comprising at least one of a quaternary ammonium halide, a quaternary phosphonium compound, a sulfonium compound, and a basic ionic exchange resin to form a halohydrin intermediate reaction product;
    concurrently:
        reacting a portion of the halohydrin intermediate reaction product with an alkali hydroxide to form a solid salt suspended in a liquid mixture comprising a dehydrohalogenated product and unreacted halohydrin intermediate, wherein the alkali hydroxide is used at less than a stoichiometric amount; and
        removing water and epihalohydrin as a vapor from the reacting mixture;
    separating the solid salt from the liquid mixture;
    reacting at least a portion of the unreacted halohydrin intermediate with an alkali hydroxide in the presence of water to form an organic mixture comprising an epoxy resin and unreacted epihalohydrin and an aqueous solution comprising a salt;
    separating the aqueous mixture from the organic mixture; and
    separating the unreacted epihalohydrin from the liquid epoxy resin.

2. The process of claim 1, further comprising contacting the organic mixture with water to separate ionic species and water-soluble impurities from the organic mixture.

3. The process of claim 1, further comprising treating the solid salt separated from the liquid mixture to recover at least one of epihalohydrin and liquid epoxy resin.

4. The process of claim 1, wherein the contacting a polyhydric phenol and an epihalohydrin is performed at a temperature in the range from 20° C. to 100° C.

5. The process of claim 1, wherein the epihalohydrin and the polyhydric phenol are contacted at a molar ratio, epihalohydrin to polyhydric phenol, within the range from 2:1 to 20:1.

6. The process of claim 1, wherein the reacting a portion of the halohydrin intermediate reaction product with an alkali hydroxide is performed at a temperature in the range from 30° C. to 90° C. and at a pressure within the range from 0.05 to 0.9 bar, and wherein the alkali hydroxide is used at less than 98 percent of the stoichiometric amount.

7. The process of claim 1, wherein the alkali hydroxide is sodium hydroxide.

8. The process of claim 1, wherein, during the reacting a portion of the halohydrin intermediate reaction product, the alkali hydroxide is used at 80 percent to 95 percent of the stoichiometric amount.

9. The process of claim 1, wherein the reacting at least a portion of the unreacted halohydrin intermediate is performed at a temperature of less than 50° C., and wherein, during the reacting at least a portion of the unreacted halohydrin intermediate, the alkali hydroxide is used at a greater than stoichiometric amount.

* * * * *